(12) United States Patent
Vazquez

(10) Patent No.: US 12,484,477 B2
(45) Date of Patent: Dec. 2, 2025

(54) BLADE SYSTEM AND MOWER FOR USE THEREWITH

(71) Applicant: Eleuterio Andre Vazquez, North Chicago, IL (US)

(72) Inventor: Eleuterio Andre Vazquez, North Chicago, IL (US)

( * ) Notice: Subject to any disclaimer, the term of this patent is extended or adjusted under 35 U.S.C. 154(b) by 510 days.

(21) Appl. No.: 17/878,439

(22) Filed: Aug. 1, 2022

(65) Prior Publication Data

US 2023/0035331 A1 Feb. 2, 2023

Related U.S. Application Data

(60) Provisional application No. 63/228,377, filed on Aug. 2, 2021.

(51) Int. Cl.

| | | |
|---|---|---|
| *A01D 34/66* | (2006.01) | |
| *A01D 34/00* | (2006.01) | |
| *A01D 34/685* | (2006.01) | |
| *A01D 34/73* | (2006.01) | |
| *A01D 43/063* | (2006.01) | |

(52) U.S. Cl.
CPC ............ *A01D 34/66* (2013.01); *A01D 34/001* (2013.01); *A01D 34/005* (2013.01); *A01D 34/73* (2013.01); *A01D 43/063* (2013.01); *A01D 34/685* (2013.01)

(58) Field of Classification Search
CPC .... A01D 34/66; A01D 34/685; A01D 34/005; A01D 42/005; A01D 34/73; A01D 43/063
See application file for complete search history.

(56) References Cited

U.S. PATENT DOCUMENTS

| | | | | |
|---|---|---|---|---|
| 3,050,924 | A | * | 8/1962 | West ...................... A01D 34/63 56/295 |
| 3,183,655 | A | * | 5/1965 | Kern ...................... A01D 34/73 56/255 |
| 3,657,867 | A | * | 4/1972 | Efflandt ............... A01D 43/063 56/200 |
| 3,816,986 | A | * | 6/1974 | Van Der Gaast .. A01D 43/0635 15/83 |
| 3,905,181 | A | * | 9/1975 | Messner ................ A01D 42/00 15/328 |
| 4,083,166 | A | * | 4/1978 | Haas .................... A01D 34/005 56/503 |
| 4,107,907 | A | * | 8/1978 | Rutherford .......... A01D 34/828 56/320.2 |

(Continued)

*Primary Examiner* — Joseph M Rocca
*Assistant Examiner* — Julia C Tran
(74) *Attorney, Agent, or Firm* — Nixon Peabody LLP

(57) ABSTRACT

A mower comprises a frame, a plurality of wheels connected to the frame, a mower deck located within the frame defining a cutting chamber, a first blade that is elongated and rotates about a generally vertical axis and has a fin extending from at least one of the ends with a concave surface that faces generally away from the ground surface, a second blade that is circular and rotates about a generally vertical axis, a propulsion unit that is supported by the frame and rotates the blades, a discharge opening allowing discharge to exit the cutting chamber, and a container pivotally coupled to the mower pivotable between a first position and a second position, with the first position of the container configured to collect the discharge from the cutting chamber through the discharge opening.

20 Claims, 5 Drawing Sheets

(56) References Cited

U.S. PATENT DOCUMENTS

| | | | |
|---|---|---|---|
| 4,161,096 A * | 7/1979 | Biberger | A01D 34/826 56/12.9 |
| 4,259,832 A * | 4/1981 | DuRay | A01D 43/063 56/202 |
| 4,269,020 A * | 5/1981 | Wolf | A01D 34/73 56/13.4 |
| 4,290,258 A * | 9/1981 | Gobler | A01D 34/73 56/295 |
| 4,951,449 A | 8/1990 | Thorud | |
| 4,967,546 A | 11/1990 | Forbush | |
| 5,040,364 A * | 8/1991 | Deegan | A01D 43/0631 56/295 |
| 5,197,268 A * | 3/1993 | Barrera | A01D 34/005 D15/17 |
| 5,205,112 A | 4/1993 | Tillotson | |
| 5,305,587 A * | 4/1994 | Johnson | A01D 34/005 56/503 |
| 5,373,687 A * | 12/1994 | Secord | A01D 34/005 56/255 |
| 5,457,946 A * | 10/1995 | Deitrick | A01D 43/063 56/203 |
| 5,884,463 A * | 3/1999 | Darzinskis | A01D 34/82 56/255 |
| 6,910,324 B2 | 6/2005 | Kakuk | |
| 7,021,040 B2 | 4/2006 | Osborne | |
| 10,440,885 B2 * | 10/2019 | Shiotsuki | A01D 34/73 |
| 11,877,535 B2 * | 1/2024 | Payne | A01D 34/733 |
| 2008/0264029 A1 * | 10/2008 | Sepaniak | A01D 43/063 56/202 |
| 2011/0023434 A1 * | 2/2011 | Sadler | A01D 43/063 56/16.6 |
| 2013/0327008 A1 * | 12/2013 | Eavenson, Sr. | A01D 34/733 56/295 |
| 2020/0093060 A1 * | 3/2020 | Kurihara | A01D 34/68 |

\* cited by examiner

BLADE SYSTEM AND MOWER FOR USE THEREWITH

CROSS-REFERENCE TO RELATED APPLICATIONS

This application claims the benefit of and priority to U.S. Provisional Patent Application No. 63/228,377, filed on Aug. 2, 2021, which is hereby incorporated by reference herein in its entirety.

TECHNICAL FIELD

This disclosure relates generally to landscape machinery, and more particularly, to mowers.

BACKGROUND

Mowers are commonly used to trim grass and dispose of debris, such as fallen leaves, from fields and lawns. Traditionally, there are two different ways to dispose of clippings from a mower: 1) bagging the clippings and removing them from the lawn; and 2) discharging the clippings onto the lawn. Oftentimes, the clippings are mulched before they are discharged onto the lawn. Ideally, when the clippings are mulched, the plant material is pulverized into fine pieces that are capable of falling beneath the standing grass blades and entering the soil. One advantage of bagging and mulching is that larger clippings are not left on the lawn. If larger clippings are left on the lawn, they may block the standing grass' access to sunlight and water, as well as cause the lawn to look untidy. The bagging mode is disadvantageous because proper disposal of the collected plant material is both timely and costly. While mulching before discharging the clippings onto the lawn does not require collection and disposal of clippings, existing mowers are often not able to maintain the clippings in the cutting chamber long enough to be fully mulched. When this occurs (i.e., when the clippings are not fully mulched) the user must make additional passes with the mower, resulting in additional time and fuel requirements. Accordingly, a need exists for a mower that prevents the accumulation of larger clippings on the lawn yet does not require disposal of clippings.

BRIEF DESCRIPTION OF THE DRAWINGS

Disclosed herein are embodiments of systems, apparatuses, and methods pertaining to mowers. This description includes drawings, wherein.

Figure 1:
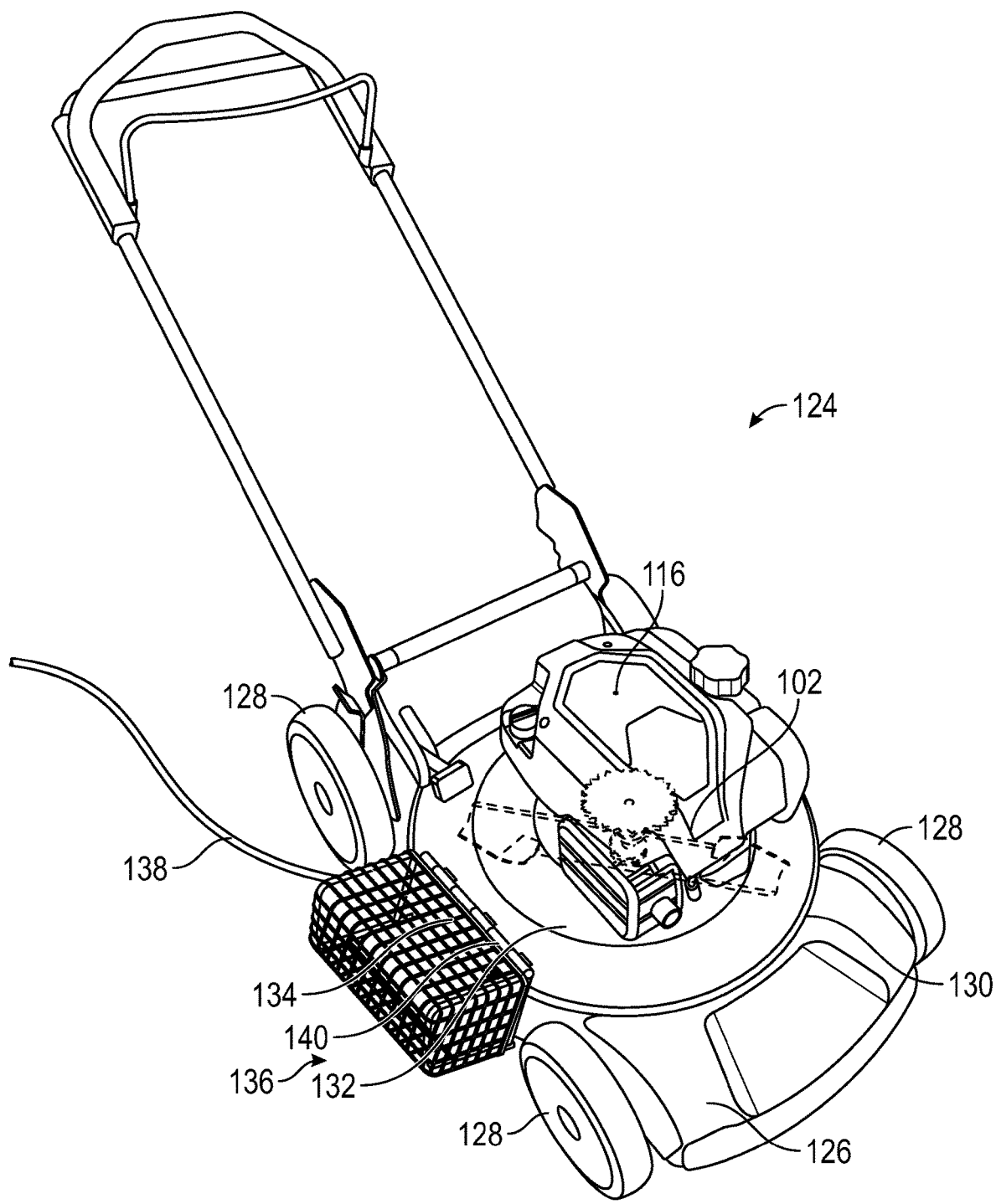
FIG. 1 is a perspective view of a mower 124 including a blade system 102 featuring multiple blades, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, apparatuses, systems, and methods are provided herein useful to mowers. In some embodiments, a mower comprises a frame, a plurality of wheels connected to the frame, a mower deck located within the frame defining a cutting chamber, a first blade that is elongated and rotates about a generally vertical axis and has a fin extending from at least one of the ends with a concave surface that faces generally away from the ground surface, a second blade that is circular and rotates about a generally vertical axis, a propulsion unit that is supported by the frame and rotates the blades, a discharge opening that allows discharge to exit the cutting chamber, and a container pivotally coupled to the mower, pivotable between a first position and a second position, with the first position of the container configured to collect the discharge from the cutting chamber through the discharge opening.

As previously discussed, drawbacks exist for current mower designs with respect to the disposal of clippings. Specifically, if clippings are left on the lawn, they may block sunlight and water from reaching the lawn and/or look unsightly. Additionally, if the clippings are bagged, additional costs and time are required to dispose of the clippings. Described herein are systems, methods, and apparatuses that seek to minimize, if not eliminate, the drawbacks of the current mower designs.

In one embodiment, a mower is described with a blade system that allows for finer mulching of clippings. Such finer mulching allows the clippings to be discharged on the lawn while minimizing, if not eliminating, the drawbacks of current systems. Additionally, because the clippings are discharged on the lawn, the costs and time associated with bagging and disposing of the clippings are eliminated. The blade system generally includes blades of different types. The blade system, in some embodiments, maintains the clippings in the cutting chamber of the mower for a longer duration resulting in greater mulching of the clippings. Additionally, in some embodiments, the mower can include a container that is quickly pivotable between an open position (in which the clippings are discharged) and a closed position (in which the clippings are not discharged). By alternating the container between the open position while the discharge opening faces the unmowed portion of a yard, and the closed position while the discharge opening faces the mowed portion of a yard, less plant material is collected, and the discharged plant material is able to undergo additional passes through the cutting chamber without the operator having to make additional passes. The discussion of FIG. 1 provides an overview of such a mower.

FIG. 1 is a perspective view of a mower 124 including a blade system 102 featuring multiple blades, according to some embodiments. A plurality of wheels 128 are attached to a frame 126 and elevate the mower 124 above the ground. The frame 126 supports a mower deck 130, which surrounds and defines a cutting chamber 132. The mower deck 130 may protect a propulsion unit 116 of the mower 124 from glass clippings and other discharge that may be dispersed by a blade system 102. The blade system 102 sits within the cutting chamber 132 and the propulsion unit 116 rotates the blade system 102. Additionally, in some embodiments, the propulsion unit 116 may propel the wheels 128. The blade system 102 is made up of multiple types of blades (described in more detail with respect to FIGS. 2 and 3). For example, as depicted in FIG. 1, a first type of blade is an elongated blade, and a second type of blade is a circular blade. The rotate within the cutting chamber 132.

A discharge opening 134 is defined by the mower deck 130 and allows grass clippings and other discharge to exit the cutting chamber 132. A container 136 is pivotally connected to the mower deck 130 by a hinge 140. The container 136 may be pivotally opened and closed via manipulation of a cord 138 (e.g., by a user of the mower 124). When the container 136 is in the closed position, discharge accumulates temporarily in the container 136 before reentering the cutting chamber 132 to be further mulched. If desired, the discharge in the container 136 can also be collected periodically when the container 136 is in the closed position. When the container 136 is in the open position, discharge exits the cutting chamber and is released back onto the lawn. In one embodiment, the user of the mower periodically opens and closes the container 136. For example, the user may leave the container in the closed position for a period of time to ensure that the clippings have been finely mulched and then later place the container 136 in the open position such that the clippings can be discharged. Additionally, the user may leave the container 136 in the closed position when the discharge opening 134 is facing a portion of the lawn that has already been mowed to avoid discharging clippings on the portion of the lawn that has already been mowed.

Figure 2:
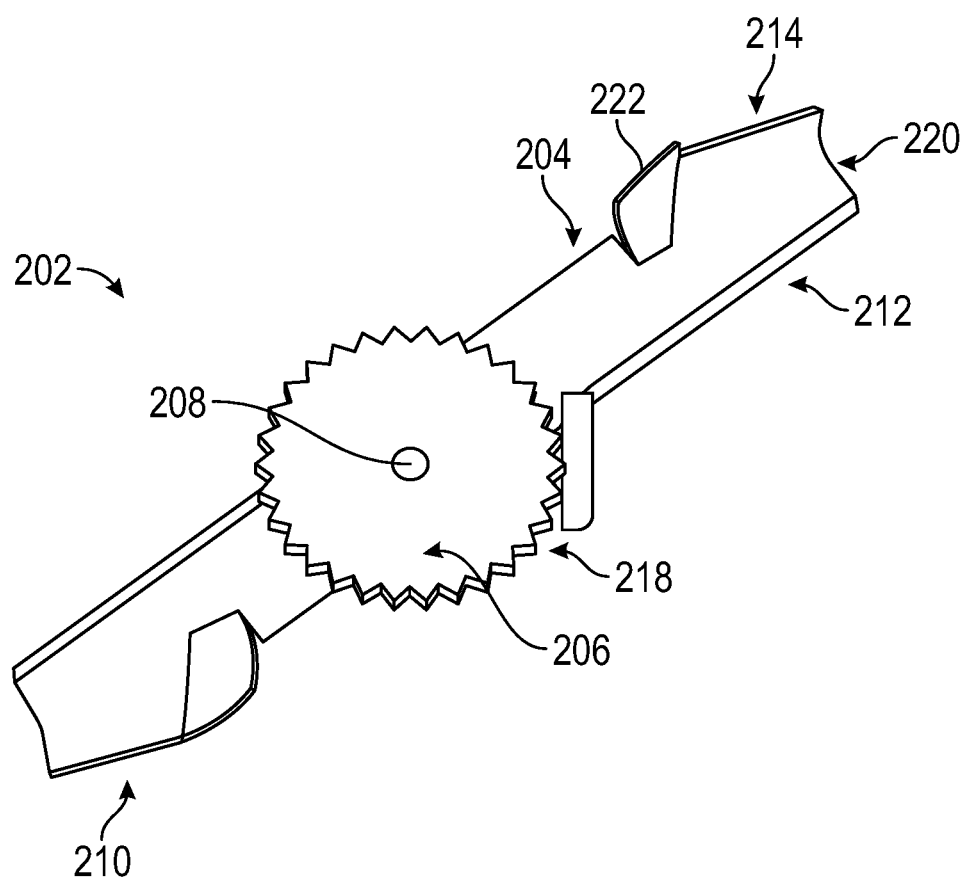
FIG. 2 is a top view of a blade system 202 including a first blade 204 and a second blade 206, according to some embodiments.

While the discussion of FIG. 1 provides background information regarding a mower in accordance with some embodiments described herein, the discussion of FIG. 2 provides additional detail regarding the blade system of such a mower.

FIG. 2 is a top view of a blade system 202 including a first blade 204 and a second blade 206, according to some embodiments. The first blade 204 is of a first type and the second blade 206 is of a second type. As depicted in the example blade system 202 of FIG. 2, the first type (i.e., the first blade 204) is an elongated blade and the second type (i.e., the second blade 206) is a circular blade.

The blade of the first type (i.e., the first blade 204) has two ends: 1) a first end 210, and 2) a second end 212. The first end 210 and the second end 212 are on opposite ends of the length of the elongated blade. The first blade 204 includes a fin 214 on at least one of the ends of the first blade 204. In some embodiments, such as in FIG. 2, both the first end 210 and the second end 212 of the first blade 202 include fins 214. A tip of the fin 222 curves up and is concave facing up. In one embodiment, the curvature of the tip of the fin 222 increases progressively along the fin 214 towards the center of the first blade 204. The curvature of the tip of the fin 222 can facilitate the scooping of clippings upwards, which maintains the clippings in the cutting chamber for a longer period of time. The first blade 204 has a trailing edge that runs along the length of the blade. In some embodiments, as depicted in FIG. 2, the trailing edge is unvented and has a continuous surface. However, in some embodiments, the trailing edge can have a vent (e.g., near the fin 214). In some embodiments, the first blade 204 has one or more blade extensions 220 that protrude from the first end 210, the second end 212, or both the first end 210 and the second end 212. The blade extensions 220 extend away from the ground surface and can aid in maintaining the clippings within the cutting chamber for a longer period of time. The blade extensions 220 can extend from the trailing edge of the first blade 204 and/or the end of the first blade 204.

The blade of the second type (i.e., the second blade 206) is a circular blade. In some embodiments, the second blade 206 has teeth protruding from the side of the blade 206 to form a serrated edge 218. The second blade 206 may have any desired number of teeth. For example, the second blade 206 may have a number of teeth in a range from 10 to 30. In one specific embodiment, the second blade 206 may have 16 to 22 teeth. The second blade 206 may have any desired thickness. For example, the second blade 206 may have a thickness in a range from ⅛ to ¼ of an inch. There may be either one blade or multiple blades of the second type (i.e., multiple second blades 206) in the blade system 202. In one form, the second blade 206 provides additional cutting of the vegetation to supplement the mulching performed by the first blade 204.

In the example depicted in FIG. 2, the blades of the blade system 202 rotate about a common axle 208. Accordingly, the first blade 204 and the second blade 206 rotate about a common, generally vertical axis. The first blade 204 and the second blade 206 may rotate about the axle 208 at different speeds and/or the same speed as well as in the same and/or different directions. In some embodiments, the first blade 204 and the second blade 206 are flush, or nearly flush, with one another. In other embodiments, the first blade 204 and the second blade 206 are spaced apart. In such embodiments, the first blade 204 and the second blade 206 may be spaced apart by (i.e., have a gap between them) of any desired dimension. For example, the first blade 204 and the second blade 206 may be spaced apart in a range from 0.05 inches to 1.00 inch. In one specific embodiment, the first blade 204 and the second blade 206 may be spaced apart in a range from 0.20 inches to 0.50 inches.

Figure 3:
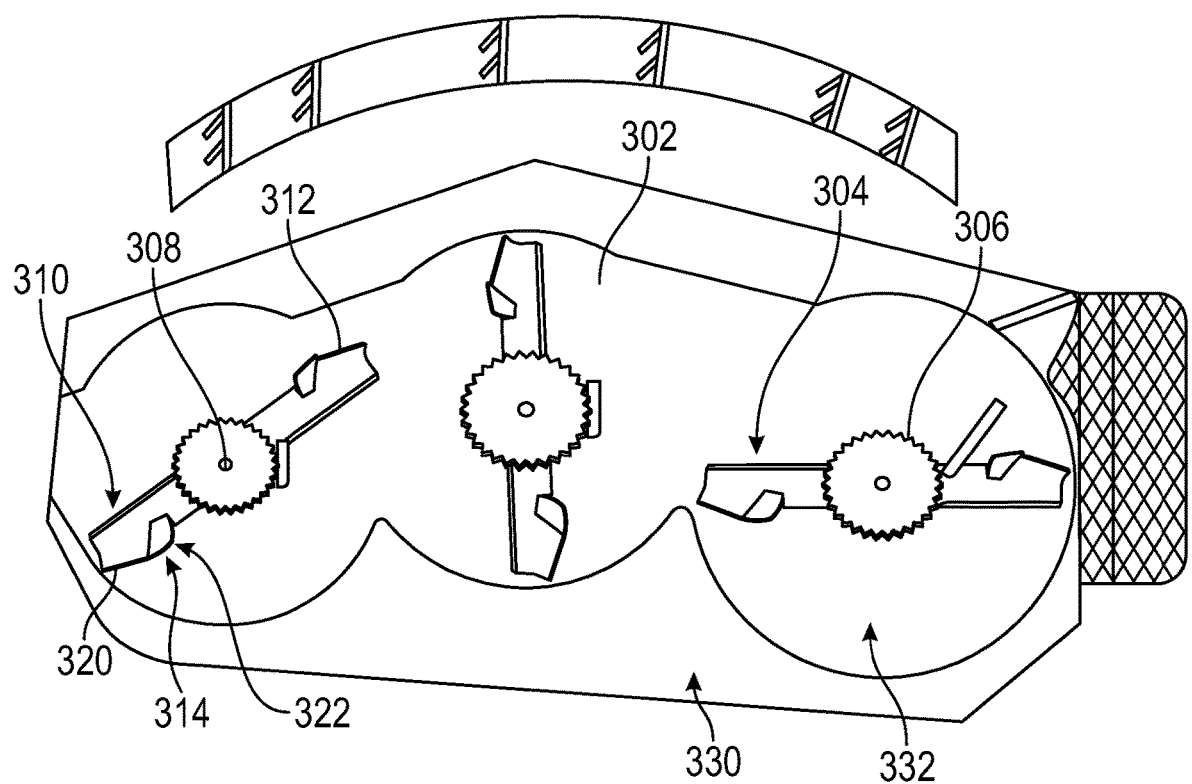
FIG. 3 is a top view of a cross-section of a bottom portion of a mower 124 including multiple groups of blades in a blade system 302, each including multiple blades, according to some embodiments.

While the discussion of FIG. 2 provides detail regarding a blade system for a mower, the discussion of FIG. 3 provides additional detail regarding the placement and interaction of multiple groups of blades within a mower.

FIG. 3 is a top view of a cross-section of a bottom portion of a mower 124 including multiple groups of blades in a blade system 302, each including multiple blades, according to some embodiments. In some embodiments, as depicted in FIG. 3, a cutting chamber 332 houses a blade system 302 with three groups of blades. The cutting chamber 332 is at least partially defined by the walls of a mower deck 330. The cutting chamber 332 is wide enough to allow each group of blades to rotate without touching the walls of the mower deck 330 or touching another group of blades. Each group of blades cuts grass or other vegetation and, while rotating, temporarily maintains the clippings within the cutting chamber 332 such that the clippings can be mulched by the blade system 302.

Each group of blades in the blade system 302 is made up of at least one blade of a first type 304 and at least one blade of a second type 306. The blades of each type rotate about a generally vertical axle 308. In some embodiments, a blade of a first type 304 and a blade of a second type 312 rotate about a common generally vertical axle 308. The blade of the first type 304 and the blade of the second type 306 may rotate about the axle 308 at different speeds and/or the same speed as well as in the same and/or different directions. In some embodiments, the blade of the first type 304 and the blade of the second type 306 are flush, or nearly flush, against each other. In further embodiments, the blade of the first type 304 and the blade of the second type 306 are spaced apart. In such embodiments, the first blade 304 and the second blade 306 may be spaced apart by (i.e., have a gap between them) of any desired dimension. For example, the first blade 304 and the second blade 306 may be spaced apart in a range from 0.05 inches to 1.00 inch. In one specific embodiment, the first blade 304 and the second blade 306 may be spaced apart in a range from 0.20 inches to 0.50 inches.

The blade of the first type (i.e., the first blade 304) is an elongated blade with a first end 310 and a second end 312. The first end 310 and the second end 312 are on opposite ends of the length of the first blade 304. A fin 314 may extend from either the first end 310, the second end 312, or both ends of the blade of the first type 304. The fin 314 has a tip 322 that extends towards the center of the elongated blade of the first type 304. In some embodiments, the first blade 304, as depicted in a group of blades in FIG. 3, has a fin 214 on both the first end 310 and the second end 312 of the blade. The tip of the fin 322 curves up and is concave facing up. In one embodiment, the curvature of the tip of the fin 322 increases progressively along the fin 314 towards the center of the first blade 304. The curvature of the tip of the fin 322 facilitates the scooping of clippings upwards, which maintains the clippings in the cutting chamber 332 for a period of time. The first blade 304 has a trailing edge 320 that runs along the length of the blade. In some embodiments, as depicted in each group of blades 302 of FIG. 3, the trailing edge 320 is unvented and has a continuous surface. However, in some embodiments, the trailing edge 320 can have a vent (e.g., near the fin 314).

A blade of the second type (i.e., the second blade 306) is also present in each group of blades in the blade system 302. The blade of the second type 306 is a circular blade. In some embodiments, as depicted in each group of blades in FIG. 3, the blade of the second type 306 is mounted above the blade of the first type 304. In further embodiments, there are multiple blades of the second type 306 in a group of blades. In one form, the second blade 306 provides additional cutting of the vegetation to supplement the mulching performed by the first blade 304. The blade of the second type 306, in some embodiments, has teeth protruding from the side of the blade 306 to form a serrated edge 318. The second blade 306 may have any desired number of teeth. For example, the second blade 306 may have a number of teeth in a range from 10 to 30. In one specific embodiment, the second blade 306 may have 16 to 22 teeth. The second blade 306 may have any desired thickness. For example, the second blade 306 may have a thickness in a range from $\frac{1}{8}$ to $\frac{1}{4}$ of an inch.

Figure 4A:
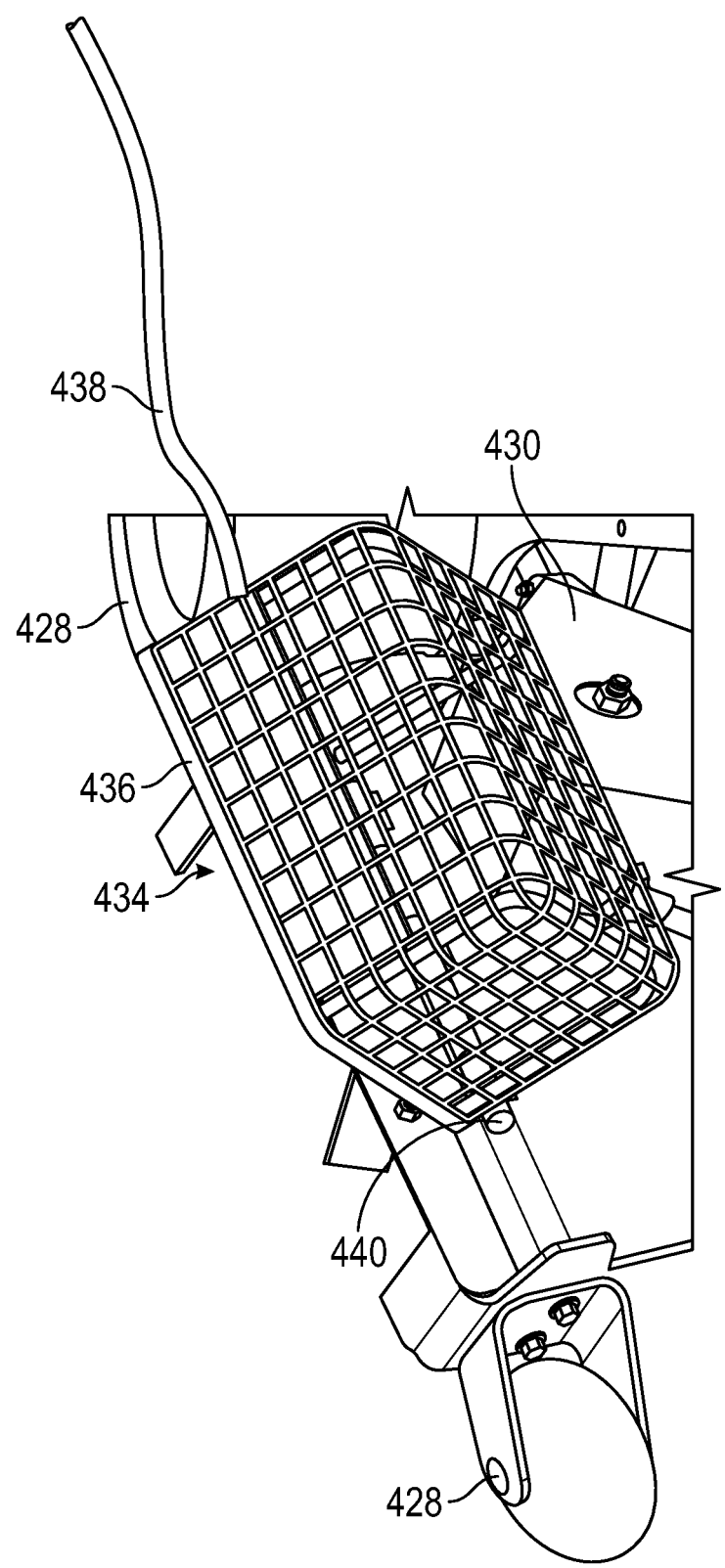
FIG. 4A is an exploded view of a container 436 pivotally attached to a mower in which the container 436 is in an open position, according to some embodiments.
Figure 4B:
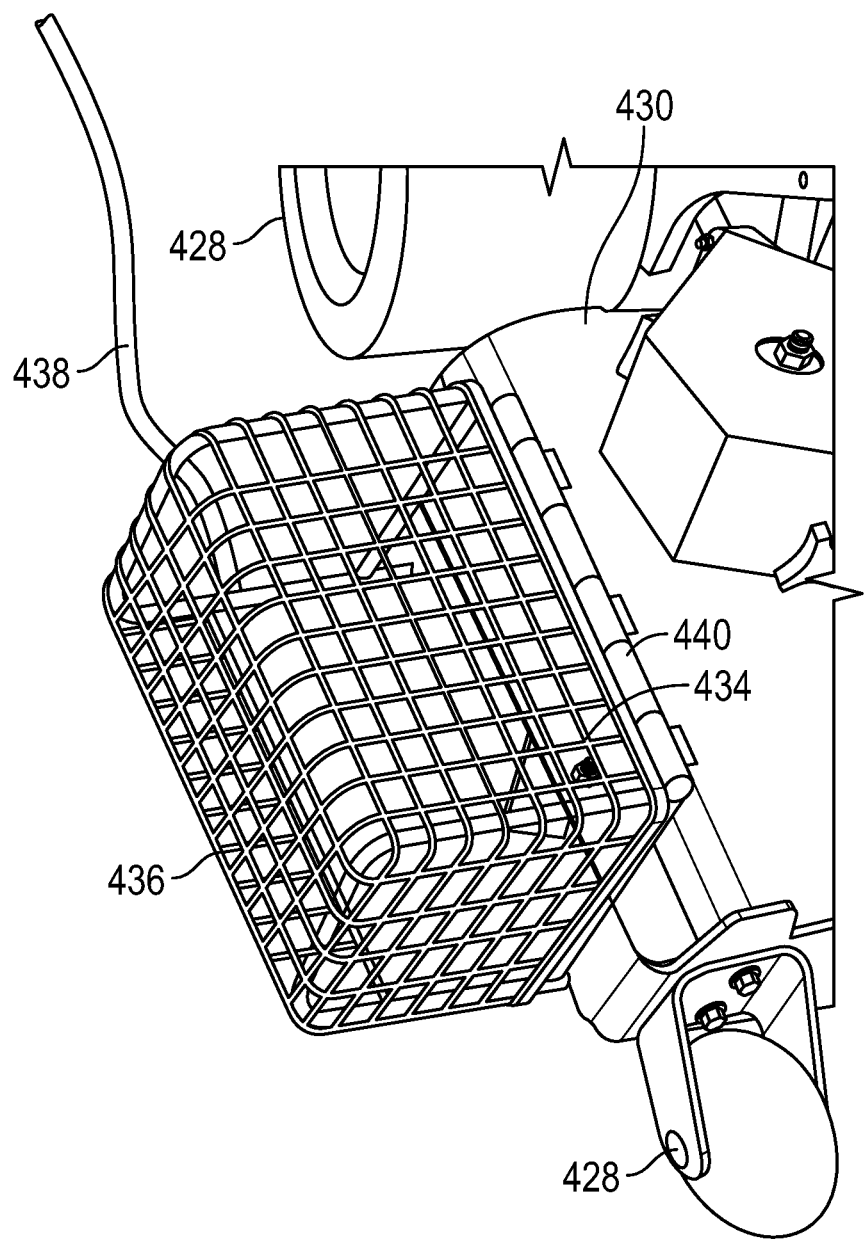
FIG. 4B is an exploded view of a container 436 pivotally coupled to a mower in which the container 436 is in a closed position, according to some embodiments.

While the discussion of FIG. 3 provides details regarding the plurality of groups of blades' position and interaction within the mower, FIGS. 4A and 4B provide detail regarding the container and its ability to switch between an open position (FIG. 4A) and a closed position (FIG. 4B).

FIG. 4A is an exploded view of a container 436 pivotally attached to a mower in which the container 436 is in an open position, according to some embodiments. The container 436 is attached to the side of a mower deck 430 by a hinge 440. The container 436 covers a discharge opening 434 when in the closed position. The discharge opening 434 is an opening defined by the mower deck 430. The mower deck 430 is lifted above the ground by a plurality of wheels 428 to which the mower deck 430 is connected.

The container 436 can pivot between an open position (i.e., as depicted in FIG. 4A) and a closed position (i.e., as depicted in FIG. 4B) around the hinge 440. A cord 438 is attached to the container 436. The container 436 can switch between the open position and the closed position upon manipulation of the cord 438. In some embodiments, as depicted in FIG. 4A, the container 436 opens and closes upon a mower operator pulling on the cord 438. Accordingly, the cord 438 can extend to any location on the mower. For example, the cord 438 can extend from the container 436 to a handle of the mower such that the user can manipulate the container between the open and closed positions while operating the mower.

The container 436 is in the open position in FIG. 4A. When the container 436 is open, the discharge opening 434 is uncovered. When the discharge opening 434 is uncovered, clippings may exit the cutting chamber through the discharge opening 434 and fall onto the lawn. Because the container 436 is easily manipulable between the open and closed positions, the user can operate the mower such that the container 436 is in the open position when the discharge opening 434 is facing an unmowed section of a lawn, which allows the clippings to undergo additional passes through the cutting chamber.

FIG. 4B is an exploded view of a container 436 pivotally coupled to a mower in which the container 436 is in a closed position, according to some embodiments. The container 436 is connected to a mower deck 430 by a hinge 440. The mower deck 430 is supported above the ground by a plurality of wheels 428 that are joined to the mower deck 430. The container 436 rests against the side of the mower deck 430 and covers a discharge opening 434 while in the closed position. A cord 438 is connected to the container 436. Upon the cord 438 being manipulated, the container 436 pivots along the hinge 440 to alternate between an open position and a closed position.

The container 436 is in the closed position in FIG. 4B. When the container 436 is closed, the discharge opening 434 is covered. When the discharge opening 434 is covered, clippings can collect in the container 436 for a period of time before returning to the cutting chamber through the discharge opening 434. A mower operator may periodically remove the clippings that collect in the container 436 or leave them in the container 436 to go through additional passes in the cutting chamber. In some embodiments, the walls of the container 436 are made up of a grid which allows smaller, fully mulched clippings to exit the container 436 when the container 436 is in the closed position. Allowing fully mulched clippings to exit the container 436 reduces the quantity of clippings that accumulate in the container 436 and allows an additional route for the clippings to exit the mower while the container 436 is in the closed position. In some embodiments, the grid wires of the container 436 are spaced apart by any desired dimension to facilitate the removal of the fully mulched clippings from the container 436. For example, the grid wires may be spaced apart in a range from 0.05 inches to 2 inches. In one specific embodiment, the grid wires may be spaced apart in a range from 0.50 inches to 1.50 inches. In some embodiments, the container 436 has a baffle on the portion of the container facing the ground surface, perpendicular to the ground surface, or both. The baffle can aid in facilitating the collection of clippings within the container 436.

In some embodiments, a blade system for a mower comprises a blade of a first type, wherein the blade of the first type is an elongated blade that is configured to rotate about a generally vertical axis and comprises a first end and a second end and a fin extends from at least one of the first and second ends, wherein the fin has a concave surface facing generally away from a ground surface, a blade of a second type, wherein the blade of the second type is a circular blade and the blade of the second type is configured to rotate about a generally vertical axis, and the blade system is configured to be rotated by a propulsion unit.

In some embodiments, a mower comprises a frame, a plurality of wheels connected to the frame, wherein the plurality of wheels is configured to elevate the frame above a ground surface, a mower deck located within the frame, wherein the mower deck defines a cutting chamber, one or more blades, wherein the one or more blades are housed in the cutting chamber, a propulsion unit, wherein the propulsion unit is supported by the frame and is configured to rotate the one or more blades, a discharge opening configured to allow discharge to exit the cutting chamber, and a container pivotally coupled to the mower, wherein the container is pivotable between a first position and a second position, wherein the container is configured to collect the discharge from the cutting chamber through the discharge opening when in the first position, and wherein the container is configured to allow bypass of the discharge from the cutting chamber through the discharge opening when in the second position.

In some embodiments, a mower comprises a frame, a plurality of wheels connected to the frame, the plurality of wheels configured to elevate the frame above a ground surface, a mower deck located within the frame, wherein the mower deck defines a cutting chamber, a first blade, wherein the first blade is elongated and configured to rotate about a generally vertical axis, wherein the first blade comprises a first end, a second end, and a fin extending from at least one of the first and second ends, wherein the fin has a concave surface facing generally away from the ground surface, a second blade, wherein the second blade is circular and configured to rotate about a generally vertical axis, a propulsion unit supported by the frame and configured to rotate the first blade and the second blade, a discharge opening configured to allow discharge to exit the cutting chamber, and a container pivotally coupled to the mower, wherein the container is pivotable between a first position and a second position, wherein the container is configured to collect the discharge from the cutting chamber through the discharge opening when in the first position.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A blade system for a mower, the blade system comprising:
    a blade of a first type, wherein the blade of the first type is an elongated blade, the blade of the first type configured to rotate about a generally vertical axis, wherein the blade of the first type comprises:
        a first end;
        a second end;
        a fin extending from at least one of the first end and the second end, the fin having a concave surface facing generally away from a ground surface and a tip disposed on a portion of the fin positioned proximately to a center of the blade of the first type, wherein the tip of the fin has an increasingly curved surface towards the center of the blade of the first type and deviates further from a surface of the blade of the first type as the tip extends towards the center of the blade of the first type; and
        a vent interrupting a trailing edge surface of the blade of the first type at an edge of the tip of the fin; and
    a blade of a second type, wherein the blade of the second type is a circular blade, and wherein the blade of the second type is configured to rotate about the generally vertical axis;
    wherein the blade system is configured to be rotated by a propulsion unit.

2. The blade system of claim 1, wherein the blade of the first type and the blade of the second type are spaced apart.

3. The blade system of claim 1, wherein the blade of the second type has a serrated edge.

4. The blade system of claim 1, wherein the blade of the first type has a continuous surface on its leading edge.

5. The blade system of claim 1, wherein the blade system comprises at least two groups of blades, wherein each group of blades includes a blade of the first type and a blade of the second type.

6. The blade system of claim 1, wherein the blade system comprises at least three groups of blades, wherein each group of blades includes a blade of the first type and a blade of the second type.

7. A mower, the mower comprising:
    a frame;
    a plurality of wheels connected to the frame, the plurality of wheels configured to elevate the frame above a ground surface;
    a mower deck located within the frame, wherein the mower deck defines a cutting chamber;
    a first blade, wherein the first blade is an elongated blade, the first blade configured to rotate about a generally vertical axis, wherein the first blade comprises:
        a first end;
        a second end; and
        a first fin extending from the first end and having a concave surface facing generally away from the ground surface, a blade extension, and a first tip, wherein the first tip of the first fin has an increasingly curved surface towards a center of the first blade and deviates continuously further from a surface of the first blade as the first tip extends towards the center of the first blade;
    a second blade;
    a propulsion unit, the propulsion unit supported by the frame and configured to rotate the first blade and the second blade;
    a discharge opening configured to allow a discharge to exit the cutting chamber;
    a container pivotally coupled to the mower, wherein the container is pivotable between a first position and a second position, the container configured to collect the discharge from the cutting chamber through the discharge opening when in the first position, the container further comprising a wire grid frame wherein the wires are spaced apart in a range from 0.05 inches to 2 inches;
    a hinge coupled to an opening edge of an opening of the container and configured to pivot the container to alternate between the first position and the second position, wherein the opening of the container is configured to allow discharge from the cutting chamber to pass therethrough when in the first position; and a cord connected to the container, wherein the cord is manipulable to pivot the container between the first position and the second position when the cord is pulled.

8. The mower of claim 7, further comprising a second fin extending from the second end and having a second tip, wherein the second tip of the second fin has an increasingly curved surface towards the center of the first blade, the second tip of the second fin being closer to the ground surface towards an outermost edge of the first blade.

9. The mower of claim 7, wherein the wires are spaced apart in a range from 0.5 inches to 1.5 inches.

10. The mower of claim 7, wherein the first and second blade are spaced apart.

11. The mower of claim 7, wherein the second blade has a serrated edge.

12. The mower of claim 7, wherein the first blade has a continuous leading edge surface.

13. The mower of claim 8, further comprising a vent interrupting a second trailing edge surface of the second end of the first blade at an edge of the second tip of the second fin.

14. The mower of claim 7, wherein the container is configured to pivot away from the ground surface and into the second position when the cord is pulled.

15. A blade system for a mower, the blade system comprising:

a blade of a first type, wherein the blade of the first type is an elongated blade, the blade of the first type configured to rotate about a generally vertical axis, wherein the blade of the first type comprises:

a first end;

a second end;

a first fin extending from the first end and having a concave surface facing generally away from a ground surface and a first tip disposed on a portion of the first fin positioned proximately to a center of the blade of the first type, wherein the first tip of the first fin has an increasingly curved surface towards the center of the blade of the first type and deviates further from a surface of the blade of the first type as the first tip extends towards the center of the blade of the first type; and a vent interrupting a trailing edge surface of the blade of the first type at an edge of the first tip of the first fin;

wherein the blade system is configured to be rotated by a propulsion unit.

16. The blade system of claim 15, wherein the blade of the first type has a continuous surface on its leading edge.

17. The blade system of claim 15, wherein the blade system comprises at least two groups of blades, wherein each group of blades includes a blade of the first type.

18. The blade system of claim 15, wherein the blade system comprises at least three groups of blades, wherein each group of blades includes a blade of the first type.

19. The blade system of claim 15, further comprising a second fin extending from the second end and having a second tip, wherein the second tip of the second fin has an increasingly curved surface towards the center of the blade of the first type, the second tip of the second fin being closer to the ground surface towards an outermost edge of the blade of the first type.

20. The blade system of claim 19, further comprising a second vent interrupting a second trailing edge surface of the blade of the first type at an edge of the second tip of the second fin.

* * * * *